United States Patent [19]

Ito et al.

[11] Patent Number: 5,518,752

[45] Date of Patent: May 21, 1996

[54] LOW-FAT CREAM COMPOSITION

[75] Inventors: Kazutaka Ito, Kaizuka; Masaaki Miyabe, Hannan, both of Japan

[73] Assignee: Fuji Oil Company, Limited, Osaka, Japan

[21] Appl. No.: 353,324

[22] Filed: Dec. 5, 1994

[30] Foreign Application Priority Data

Dec. 27, 1993 [JP] Japan ................................ 5-329213

[51] Int. Cl.⁶ .................................................. A23C 13/14
[52] U.S. Cl. ........................ 426/586; 426/585; 426/601; 426/602; 426/604
[58] Field of Search ............................... 426/601, 602, 426/604, 585, 586

[56] References Cited

U.S. PATENT DOCUMENTS

| | | | |
|---|---|---|---|
| 4,857,358 | 8/1989 | Okumura | 426/602 |
| 5,149,557 | 9/1992 | Morrison et al. | 426/602 |
| 5,352,474 | 10/1994 | Lammers et al. | 426/602 |
| 5,393,554 | 2/1995 | Mori et al. | 426/602 |

*Primary Examiner*—Helen Pratt
*Attorney, Agent, or Firm*—Wenderoth, Lind & Ponack

[57] ABSTRACT

A low-fat cream composition which comprises oil-and-fat ingredients and emulsifying agent ingredients, wherein the solid fat content of said oil-and-fat ingredient is not less than 50% at 5° C. and not less than 40% at 15° C., and 2-unsaturated-1,3-disaturated triglycerides are contained in said oil-and-fat ingredients at an amount of at least 25% based on the total weight of the fatty ingredients, said emulsifying agent ingredients comprise essentially only emulsifying agents having an HLB of not higher than 8.5 and are contained in said cream composition at an amount of 0.15 to 1.0% based on the total weight of said cream composition, and polyglycerin fatty acid ester as an emulsifying agent ingredient is contained in said cream composition at an amount of 0.1 to 0.4% based on the total weight of said cream composition. It has good over-run after the whipping and capability of making artificial flowers, good stability at room temperature and excellent flavor and melting properties in the mouth.

9 Claims, No Drawings

LOW-FAT CREAM COMPOSITION

FIELD OF THE INVENTION

The present invention relates to a low-fat composition. More, particularly, it relates to a low-fat composition having good forming properties, shape retention and the like in spite of low fat content.

BACKGROUND OF THE INVENTION

In recent years, there has been a demand in the field of food industry on the development of low-caloric, light and soft foods and also to vary the habits of eating and increasing the intention of establishing good health. Also in a whipping cream, attempts to decrease the content of fatty ingredients have been made for the purpose of attaining light flavor and calorie decrease.

A whipping cream is difficult to exhibit stable physical properties after whipping, if the content of fatty ingredients is not greater than 40% (% refers to as % by weight hereinafter), based on the total weight of the cream. When the content of fatty ingredients is reduced, the resulting cream has such the disadvantages that (1) good over-run cannot be obtained unless whipping is carried out for a longer period of time, (2) the whipped cream has spongy properties and no suitable hardness, (3) shape retention is remarkably deteriorated and (4) water separation is easily caused. Further, when the content of fatty ingredients is reduced, since the addition of other solids such as sugars is required, the desired calorie decrease can not be attained.

In view of the above circumstances, the elimination of the above disadvantages by selective addition of particular emulsifying agents at greater amounts is disclosed (JP-A 62-118855, JP-B 63-32421, JP-A 64-51054). Selection of the amount of lauric-type fat-and-fat ingredients contained in the cream and SFC of fat-and-fat ingredients is also disclosed (JP-A 2-100646). As described above, a variety of whipping low-fat creams have been developed up to date.

However, these kinds of whipping low-fat cream have the following disadvantages. For example, in the case of cream characterized by the use of a combination of emulsifying agents, the addition of selected particular emulsifying agents to the cream at great amounts is required for the purpose of attaining stable physical properties of the cream. Even if the physical properties of the cream are said to be stable, this only means that the texture of the cream is achieved with air bubbles held by the function of the emulsifying agents. Such a kind of cream has only a little portion of the original good taste provided by fat, and the flavor thereof is significantly deteriorated by the addition of emulsifying agents.

In the low-fat creamy oil-and-fat composition containing a selected range of amount of oil-and-fat ingredients disclosed in JP-A 2-100646, the solid fat content (SFC) of the oil-and-fat ingredients contained therein is not less than 50% at 5° C. and 30 to 40% at 15° C. Such oil-and-fat ingredients exhibit a relatively gentle curve of the solid fat content (SFC); therefore, even if a cream composition is produced using such oil-and-fat ingredients and then whipped, it is difficult to obtain a whipped cream having sharp melting properties in the mouth with cool feel. This composition exhibits poor shape retention when left to stand at room temperature. Further, with a decrease in the fatty-ingredients content, the physical properties of the composition, such as over-run after the whipping and capability of making artificial flowers (decoration) are seriously deteriorated.

OBJECTS OF THE INVENTION

The main object of the present invention is to provide a low-fat cream composition which does not require the use of a great amount of selected particular emulsifying agents, even if the fatty-ingredients content is low, and has good over-run after the whipping and capability of making artificial flowers, good stability at room temperature and excellent flavor and melting properties in the mouth.

This object as well as other objects and advantages of the present invention will become apparent to those skilled in the art from the following description.

SUMMARY OF THE INVENTION

In general, conventional oil-and-fat ingredients having a high content of SUS-type triglycerides are disadvantageous in that any cream composition prepared therefrom has quite poor emulsion-stability and has a tendency to cause the so-called "thickening (plasticization)". It has, therefore, been said so far that the conventional oil-and-fat ingredients are unfavorable for raw materials of whipping cream.

However, the present inventors have studied in detail the original function of oil-and-fat ingredients, and found that a low-fat cream which solves the above-described problems can be obtained by combining a lauric-type oil-and-fat ingredients with the conventional oil-and-fat ingredients which are rich in SUS-type triglycerides (Copending U.S. application Ser. No. 08/193,028). The present inventors have further studied extensively a low-fat cream based on the above findings and, as a result, found that (1) a wide range of oil-and-fat ingredients can be used in addition to lauric-type oil-and-fat ingredients together with oil-and-fat ingredients rich in SUS-type triglycerides as far as particular emulsifying agents are used, (2) the resulting cream has good whipping properties, as well as excellent capability of making artificial flowers, shape retention and resistance to water separation at 20° to 25° C. which have never been attained even by a high-oil cream, and (3) the resulting cream has much better flavor and melting properties in the mouth than those of the low-fat cream, disclosed in said copending application Ser. No. 08/193,028, having favorable properties as a commercial product.

The present invention was completed based on the above findings and provides a low-fat cream composition which comprises oil-and-fat ingredients and emulsifying agent ingredients, wherein the SFC of said oil-and-fat ingredients is not less than 50% at 5° C. and not less than 40% at 15° C., SUS-type triglycerides is contained in said oil-and-fat ingredients at an amount of at least 25% based on the total weight of the fatty ingredients, said emulsifying agent ingredients comprise essentially only emulsifying agents having HLB of not higher than 8.5 and are contained in said cream composition at an amount of 0.15 to 1.0% based on the total weight of said cream composition, and polyglycerin fatty acid ester as an emulsifying agent ingredient is contained in said cream composition at an amount of 0.1 to 0.4% based on the total weight of said cream composition.

DETAILED DESCRIPTION OF THE INVENTION

As used herein, the term "cream" or "cream composition" refers to an oil-in-water (O/W) type or water-in-oil-in-water type (W/O/W) emulsion, having fluidity, obtained by emulsification using the aqueous phase wherein oil-and-fat ingredients, proteins and other ingredients are dissolved or dispersed in water. Such cream or cream composition may be also be called "whipping cream". When this cream composition is whipped so as to hold air bubbles therein, with a whipping tool or an exclusive mixer, it will become "whipped cream", so called in general.

The content of oil-and-fat ingredients is suitably not greater than 40%, preferably 10 to 35% based on the weight of the cream. When the content of oil-and-fat ingredients exceeds 40%, it leads to a tendency to cause the co-called "thickening (plasticization).

Examples of the oil-and-fat ingredients rich in SUS-type triglycerides are palm oil, illipe butter, shea butter, hardened or fractioned oil-and-fat ingredients thereof, or interesterified oil-and-fat ingredients obtained by introducing saturated fatty acids at the 1-and 3-positions of triglycerides contained in oil-and-fat ingredients rich in unsaturated fatty acids at the 2-position of the triglyceride. SUS-type triglyceride refers to 2-unsaturated-1,3-disaturated triglycerides and the fatty acid residues thereof have from 8 to 22 carbon atoms (they may contain a small amount of short-chain fatty acids). Examples of the 2-unsaturated fatty acids are oleic acid, linoleic acid and linolenic acid. Among the above-described SUS-type triglycerides, palm oil is easily available due to relatively stable industrial output and is inexpensive.

The above oil-and-fat ingredients contain preferably at least 25%, more preferably at least 35% of SUS-type triglycerides based on the total amount of the fatty ingredients. When the content of SUS-type triglycerides is below 25%, it is difficult to whip the cream composition finally obtained. The solid fat content (SFC) in the oil-and-fat ingredients is not less than 50% at 5° C. and not less than 40% at 15° C. so as to provide sharp melting properties.

The other oil-and-fat ingredients may be contained in the present low-fat cream in addition to the oil-and-fat ingredients rich in SUS-type triglycerides so far as SUS-triglyceride and SFC are satisfied with the above-described requirements. The cream of the present invention may contain a wide range of oil-and-fat ingredients in addition to lauric-type oil-and-fat ingredients as far as particular emulsifying agents are employed. Examples of other oil-and-fat ingredients are soybean oil, rapeseed oil and palm oil which are generally used in a cream. These oils may be used alone or in combination with each other, or they may be hardened, fractioned or interesterified ones.

Emulsifying agents to be used in the present invention comprises essentially only emulsifying agents having an HLB value of not greater than 8.5, in other words, lipophilic emulsifying agents. Further, the present cream must contain 0.1 to 0.4% of polyglycerin fatty acid esters. The polyglycerin fatty acid ester has preferably a polymerization degree of 4 to 10 and the component fatty acids of polyglycerin are preferably unsaturated fatty acids such as oleic acid and linoleic acid. In the present invention, such the polyglycerin fatty acid ester may be used alone to obtain a desired low-fat cream with the proviso that the emulsifying agents are contained at a total amount of 0.15 to 1.0% in the cream. When the total amount of the emulsifying agents is below 0.15%, cream having good properties is not obtained. On the other hand, when the total amount of the emulsifying agents is above 1.0%, it leads to easy thickening "plasticization" and deteriorated flavor.

Examples of the emulsifying agents other than polyglycerin fatty acid ester are monoglycerin fatty acid ester, sorbitan fatty acid ester and lecithin. Monoglycerin fatty acid ester is preferably contained in an amount of not greater than 0.15%, sorbitan fatty acid ester is preferably contained in an amount of not greater than 0.22%, and lecithin is preferably contained in an amount of not greater than 0.35%. In particular, monoglycerin fatty acid ester and/or sorbitan fatty acid ester are preferably contained so as to obtain a certain range of over-run in the optimally foamed state when the resulting cream is whipped. Other emulsifying agents are used so that sum of the amount of monopolyglycerin fatty acid ester and half of the amount of sorbitan fatty acid ester falls within a range of 0.035 to 0.085%. Lecithin is preferably contained in an amount of 0.06% to 0.12% in the cream in addition to monoglycerin fatty acid ester and sorbitan fatty acid ester so as to avoid thickening "plasticization".

In the present invention, the content of polyglycerin fatty acid ester is preferably 0.15% to 0.3%.

The total amount of the emulsifying agents is preferably not greater than 0.8%, more preferably not greater than 0.5%.

When emulsifying agents other than lecithin are used at an amount outside the above-described range, it leads to a tendency to cause thickening "plasticization" and deteriorated flavor. In particular, the use of a great amount of lecithin has a tendency to deteriorate the flavor.

As described above, the emulsifying agents to be contained in the present cream are essentially only emulsifying agents having an HLB value of not greater than 8.5, that is, so-called lipophilic emulsifying agents. In this respect, the use of only lipophilic emulsifying agents is unexpected from the fact that both lipophilic emulsifying agents and hydrophilic emulsifying agents such as sugar esters have been used in the prior creams. As used herein, "essentially only emulsifying agents having HLB of not greater than 8.5" means that emulsifying agents such as organic acid monoglycerides or sugar esters may be contained therein so far as the properties of the resulting cream are not deteriorated.

The aqueous phase for preparing an emulsion may be obtained by mixing whole milk, skimmed milk powder, or milk powder thereof, or soybean protein or the like with water according to the conventional method. Protein solids may be used in an amount of 0.5 to 2.0% by weight.

In addition to protein solids, various phosphates such as hexametaphosphate and sodium bicarbonate may be used. Further, if needed, a stabilizer may be used. Examples of the stabilizer are gums, cellulose and the like.

The low-fat cream of the present invention can be prepared according to the known method. For example, the fatty phase and aqueous phase are mixed to pre-emulsify, homogenized, pasteurized or sterilized, re-homogenized, cooled, and subjected to aging to obtain the desired cream. Homogenization or stirring may be carried out before or after pasteurization or (UHT: ultra-high-temperature) sterilization. Homogenization can be carried out by either of primary-homogenization or second-homogenization, or by two stage-homogenization as a combination of primary- and second-homogenization.

The present low-fat cream has excellent shape retention after the whipping and excellent capability of making artificial flowers and, therefore, it can be used in general confectionery. In the present low-fat cream, increase in over-run derived from low content of fatty ingredient is inhibited. Therefore, whipped cream having good flavor and feeling in a mouth can be obtained from the present low-fat cream. The low-fat cream of the present invention is used widely, for example, for fruit dressing cream in addition to whipping cream.

The following Examples and Comparative Examples illustrate the present invention in detail but are not to be construed to limit the scope thereof.

In the Examples and Comparative Examples, each cream composition was prepared by pre-emulsifying the ingredients shown in each formulation below, homogenizing the pre-emulsified ingredients at the pressure of 70 Mg/cm², treating the homogenate using ultra-high-temperature sterilization at 145° C. for a few seconds, re-homogenizing the sterilized homogenate at the pressure of 70 Kg/cm², cooling the re-homogenate, then subjecting the cooled rehomogenate to aging for 24 hours. Whipping was carried out with Kenwood mixer. Over-run after the whipping, shape retention at 5° to 20° C., flavor and melting in a mouth were examined. The results of Comparative Studies are shown in Comparative Examples 1 to 4. It should be noted that parts and percents (%) as used in Examples, Comparative Examples and claims are all by weight.

Example 1

Formulation

| | |
|---|---|
| Oil-and-fat ingredients* | 25.00% |
| Soybean lecithin (HLB 3) | 0.10% |
| Monoglycerin fatty acid ester (HLB 3) | 0.03% |
| Tetraglycerin monoester (HLB 8) | 0.15% |
| Water | 70.62% |
| Skimmed milk powder | 4.00% |
| Alkali metal salts of phosphoric acid | 0.10% |
| *Mixed fat of | |
| Palm mid-fraction (m.p. 34° C.) | 60 parts, and |
| Hardened mixed oil (m.p. 35° C.) of 25 parts of soybean oil and 15 parts of palm soft oil | 40 parts |
| SUS type triglyceride in fatty ingredients | 49.2% |
| SFC   5° C. | 68% |
|       15° C. | 57% |

Results

| | |
|---|---|
| Whipping time | 3' 10" |
| Overrun | 100% |
| Shape retention | Good |
| Flavor | Good |
| Melting properties in a mouth | Good |

Example 2

Formulation

| | |
|---|---|
| Oil-and-fat ingredients* | 25.00% |
| Soybean lecithin (HLB 3) | 0.30% |
| Monoglycerin fatty acid ester (HLB 3) | 0.05% |
| Hexaglycerin pentaester (HLB 4) | 0.15% |
| Water | 74.40% |
| Skimmed milk powder | 4.00% |
| Alkali metal salts of phosphoric acid | 0.10% |
| *Mixed fat of | |
| Palm mid-fraction (m.p. 34° C.) | 80 parts, and |
| Hardened rapeseed oil (m.p. 35° C.) | 20 parts |
| SUS type triglyceride in fatty ingredients | 65.0% |
| SFC   5° C. | 65% |
|       15° C. | 55% |

Results

| | |
|---|---|
| Whipping time | 3' 50" |
| Overrun | 90% |
| Shape retention | Good |
| Flavor | Good |
| Melting properties in a mouth | Good |

Example 3

Formulation

| | |
|---|---|
| Oil-and-fat ingredients* | 30.00% |
| Soybean lecithin (HLB 3) | 0.10% |
| Monoglycerin fatty acid ester (HLB 3) | 0.04% |
| Decaglycerin decaester (HLB 3) | 0.20% |
| Water | 65.56% |
| Skimmed milk powder | 4.00% |
| Alkali metal salts of phosphoric acid | 0.10% |
| *Mixed fat of | |
| Palm mid-fraction (m.p. 34° C.) | 85 parts, and |
| Hardened rapeseed oil (m.p. 35° C.) | 15 parts |
| SUS type triglyceride in fatty ingredients | 70.0% |
| SFC   5° C. | 70% |
|       15° C. | 61% |

Results

| | |
|---|---|
| Whipping time | 4' 30" |
| Overrun | 105% |
| Shape retention | Good |
| Flavor | Good |
| Melting properties in a mouth | Good |

Example 4

Formulation

| | |
|---|---|
| Oil-and-fat ingredients* | 25.00% |
| Soybean lecithin (HLB 3) | 0.30% |
| Sorbitan fatty acid ester (HLB 4) | 0.10% |
| Tetraglycerin monoester (HLB 8) | 0.15% |
| Water | 70.35% |
| Skimmed milk powder | 4.00% |
| Alkali metal salts of phosphoric acid | 0.10% |
| *Mixed fat of | |
| Palm mid-fraction (m.p. 34° C.) | 80 parts, and |
| Hardened mixed oil (m.p. 34° C.) of 15 parts of rapeseed oil and 5 parts of palm soft oil | 20 parts |
| SUS type triglyceride in fatty ingredients | 65.0% |
| SFC   5° C. | 71% |
|       15° C. | 63% |

Results

| | |
|---|---|
| Whipping time | 2' 50" |
| Overrun | 120% |
| Shape retention | Good |
| Flavor | Good |
| Melting properties in a mouth | Good |

Example 5

Formulation

| | |
|---|---|
| Oil-and-fat ingredients* | 35.00% |
| Soybean lecithin (HLB 3) | 0.30% |
| Monoglycerin fatty acid ester (HLB 3) | 0.03% |
| Hexaglycerin pentaester (HLB 4) | 0.15% |
| Water | 60.42% |
| Skimmed milk powder | 4.00% |
| Alkali metal salts of phosphoric acid | 0.10% |
| *Mixed fat of | |
| Fractioned shea butter (m.p. 38° C.) | 80 parts, and |
| Hardened rapeseed oil (m.p. 35° C.) | 20 parts |
| SUS type triglyceride in fatty ingredients | 62.5% |
| SFC   5° C. | 80% |
|       15° C. | 67% |

Results

| | |
|---|---|
| Whipping time | 2' 45" |

| | |
|---|---|
| Overrun | 75% |
| Shape retention | Good |
| Flavor | Good |
| Melting properties in a mouth | Good |

Example 6

| Formulation | |
|---|---|
| Oil-and-fat ingredients* | 18.00% |
| Soybean lecithin (HLB 3) | 0.08% |
| Monoglycerin fatty acid ester (HLB 3) | 0.10% |
| Tetraglycerin monoester (HLB 8) | 0.30% |
| Water | 76.52% |
| Skimmed milk powder | 4.00% |
| Alkali metal salts of phosphoric acid | 0.10% |
| *Mixed fat of | |
| Illipe butter | 60 parts, and |
| Hardened coconut | 40 parts |
| SUS type triglyceride in fatty ingredients | 51.0% |
| SFC  5° C. | 78% |
|      15° C. | 60% |
| Results | |
| Whipping time | 3' 15" |
| Overrun | 90% |
| Shape retention | Good |
| Flavor | Good |
| Melting properties in a mouth | Good |

Example 7

| Formulation | |
|---|---|
| Oil-and-fat ingredients* | 25.00% |
| Monoglycerin fatty acid ester (HLB 3) | 0.03% |
| Tetraglycerin monoester (HLB 8) | 0.20% |
| Water | 70.67% |
| Skimmed milk powder | 4.00% |
| Alkali metal salts of phosphoric acid | 0.10% |
| *Mixed fat of | |
| Palm mid-fraction (m.p. 34°) | 60 parts, and |
| Hardened mixed oil (m.p. 35°) of 5 parts of soybean oil and 15 parts of palm soft oil | 40 parts |
| SUS type triglyceride in fatty ingredients | 49.2% |
| SFC  5° C. | 68% |
|      15° C. | 57% |
| Results | |
| Whipping time | 2' 30" |
| Overrun | 125% |
| Shape retention | Good |
| Flavor | Good |
| Melting properties in a mouth | Good |

Example 8

| Formulation | |
|---|---|
| Oil-and-fat ingredients* | 25.00% |
| Tetraglycerin monoester (HLB 8) | 0.20% |
| Water | 70.70% |
| Skimmed milk powder | 4.00% |
| Alkali metal salts of phosphoric acid | 0.10% |
| *Mixed fat of | |
| Palm mid-fraction oil (m.p. 34° C.) | 60 parts, and |
| Hardened rapeseed oil (m.p. 35°) | 40 parts |
| SUS type triglyceride in fatty ingredients | 65.0% |
| SFC  5° C. | 65% |
|      15° C. | 55% |
| Results | |
| Whipping time | 2' 5" |

| | |
|---|---|
| Overrun | 110% |
| Shape retention | Good |
| Flavor | Good |
| Melting properties in a mouth | Good |

Comparative Example 1

A cream composition was prepared according to the same formulation as Example 1 except that sugar ester (HLB 11) was used instead of monoglycerin fatty acid ester (HLB 3). The resulting cream composition had poor shape retention and water separation was observed.

Comparative Example 2

A cream composition was prepared according to the same formulation as Example 2 except that soybean lecithin (HLB 3) was added at an amount of greater than 0.35%. The resulting cream composition had deteriorated flavor.

Comparative Example 3

A cream composition was prepared according to the same formulation as Example 4 except that sorbitan fatty acid ester (HLB 4) was added at an amount of greater than 0.22%. The resulting cream composition had a tendency to cause emulsion break (occurrence of thickening "plasticization").

Comparative Example 4

A cream composition was prepared according to the same formulation as Example 6 except that diacetyltartaric acid monoglyceride (HLB 9) was used instead of monoglycerin fatty acid ester (HLB 3). The resulting cream composition had inferior flavor as compared with that of the whipped cream in Example 6.

Comparative Example 5

A cream composition was prepared according to the same formulation as Example 8 except that polyglycerin fatty acid ester was added at an amount of 0.12%. The resulting cream composition was difficult to be whipped and its shape retention was not maintained.

What is claimed is:

1. A low-fat cream composition which comprises oil-and-fat ingredients in an amount not greater than 40%, based on the total weight of the low-fat cream composition and emulsifying agent ingredients, wherein a solid fat content of said oil-and-fat ingredient is not less than 50% at 5° C. and not less than 40% at 15° C., and 2-unsaturated-1,3-disaturated triglycerides are contained in said oil-and-fat ingredients in an amount of at least 25% based on the total weight of the fatty ingredients, said emulsifying agent ingredients comprise essentially only emulsifying agents having an HLB of not greater than 8.5 and are contained in said cream composition at an amount of 0.15 to 1.0% based on the total weight of said cream composition, and polyglycerin fatty acid ester having a polymerization degree of 4 to 10 as an emulsifying agent ingredient is contained in said cream composition in an amount of 0.1 to 0.4% based on the total weight of said cream composition.

2. The low-fat cream composition according to claim 1 wherein the component fatty acids of polyglycerin fatty acid ester are mainly unsaturated fatty acids.

3. The low-fat cream composition according to claim 1 or 2, wherein as emulsifying agents other than polyglycerin fatty acid ester, 0 to 0.15% of monoglycerin fatty acid ester, 0 to 0.22% of sorbitan fatty acid ester, and 0 to 0.35% of lecithin are contained in said cream composition based on the total weight of said cream composition.

4. The low-fat cream composition according to claim 1 or 2, wherein monoglycerin fatty acid ester and/or sorbitan fatty acid ester are contained in said cream composition, and sum of the amount of monoglycerin fatty acid eater and half of the amount of sorbitan fatty acid ester falls within a range of 0.035 to 0.085% based on the total weight of said cream composition.

5. The low-fat cream composition according to claim 1 or 2, wherein lecithin is contained at an amount of 0.06% to 0.12% based on the total weight of said cream composition.

6. The low-fat cream composition according to claim 1 or 2, wherein polyglycerin fatty acid ester is contained at an amount of 0.15% to 0.3% based on the total weight of said cream composition.

7. The low-fat cream composition according to claim 1 or 2, wherein the total amount of the emulsifying agents is not greater than 0.8% based on the total weight of said cream composition.

8. The low-fat cream composition according to claim 1 or 2, wherein the total amount of the emulsifying agents is not greater than 0.5% based on the total weight of said cream composition.

9. The low-fat composition according to claim 1 or 2 wherein the content of oil-and-fat ingredients is 10 to 35%, based on the total weight of the composition.

* * * * *